United States Patent [19]

Charboneau

[11] Patent Number: 5,551,484
[45] Date of Patent: Sep. 3, 1996

[54] PIPE LINER AND MONITORING SYSTEM

[76] Inventor: Kenneth R. Charboneau, 213 Ranger Pl., Slidell, La. 70458

[21] Appl. No.: 292,579
[22] Filed: Aug. 19, 1994
[51] Int. Cl.⁶ .................................................. F16L 55/00
[52] U.S. Cl. .......................... 138/104; 138/125; 138/172; 138/DIG. 2
[58] Field of Search ................................... 138/104, 123, 138/125, 137, 172, DIG. 2, DIG. 7, 118.1, 97; 250/227.16, 227.14

[56] References Cited

U.S. PATENT DOCUMENTS

| | | |
|---|---|---|
| 3,462,825 | 8/1969 | Pope . |
| 3,856,905 | 12/1974 | Dawson . |
| 4,029,889 | 6/1977 | Mizuochi . |
| 4,095,174 | 6/1978 | Ishido . |
| 4,303,457 | 12/1981 | Johansen et al. ........................ 138/123 |
| 4,421,979 | 12/1983 | Asawa et al. . |
| 4,465,105 | 8/1984 | Slater ..................................... 138/104 |
| 4,553,568 | 11/1985 | Piccoli et al. ........................... 138/125 |
| 4,554,650 | 11/1985 | Brown et al. ............................ 138/104 |
| 4,653,541 | 3/1987 | Oehlschlaeger et al. ................ 138/104 |
| 4,654,520 | 3/1987 | Griffiths . |
| 4,675,780 | 6/1987 | Barnes et al. ........................... 138/103 |
| 4,693,281 | 9/1987 | Creedon ................................... 138/172 |
| 4,787,702 | 11/1988 | Khalil ..................................... 350/96.23 |
| 4,795,232 | 1/1989 | Persson . |
| 4,891,511 | 1/1990 | Reed ..................................... 250/227.16 |
| 4,901,584 | 2/1990 | Brunner et al. ....................... 250/227.14 |
| 4,990,769 | 2/1991 | Hazan et al. ......................... 250/227.16 |
| 5,072,622 | 12/1991 | Roach . |
| 5,172,730 | 12/1992 | Driver ..................................... 138/104 |
| 5,182,799 | 1/1993 | D'Agostino et al. . |
| 5,293,039 | 3/1994 | Mongiols ............................ 250/227.16 |
| 5,305,798 | 4/1994 | Driver ..................................... 138/104 |
| 5,399,854 | 3/1995 | Dunphy et al. ..................... 250/227.14 |

FOREIGN PATENT DOCUMENTS

| | | |
|---|---|---|
| 575424 | 5/1959 | Canada . |
| 1241262 | 8/1988 | Canada . |

OTHER PUBLICATIONS

Fiberoptic Sensors. This article is reprinted from a Jan. 1993 technical brief on the Electric Power Research Institute Project, RP 8004. IEEE Power Engineering Reviews Aug. 1993.

*Primary Examiner*—David Scherbel
*Assistant Examiner*—James F. Hook
*Attorney, Agent, or Firm*—Juan J. Lizarraga

[57] ABSTRACT

A multi-layered liner for lining a pipeline which has an external jacket, an interior liner, a woven intermediate layer between the external jacket and the interior liner. At least one optical fiber is in the woven intermediate liner for purposes of monitoring stress or for communication, and a capacitance leak detection circuit is also in the multi-layered liner for the purpose of detecting leaks in the multi-layered liner. Also included is the method of monitoring a pipeline for stress or leakage by use of a stress detector connected to an optic fiber in a multi-layered liner installed in the pipeline and a leak detector connected to a capacitance circuit in a multi-layered liner installed in a pipeline.

9 Claims, 5 Drawing Sheets

PIPE LINER AND MONITORING SYSTEM

FIELD OF THE INVENTION

The present invention relates to an apparatus to repair and monitor pipelines for corrosion, wear and damage and a method for repairing and monitoring pipelines.

BACKGROUND OF THE INVENTION

To protect against damage to pipelines, corrosion resistant thermoplastic liners have been used in pipelines. Lining of pipelines in such a manner eliminates the need for "digging up" and replacing pipeline which can be very costly.

Heretofore, two types of liners for pipes, loose fitting liners and tight fitting liners, were utilized. A loose fitting liner has been described as one that contains the pressure of the fluid or gas in the liner. A tight fitting liner is flush against and tightly engaged with the interior wall of the pipeline. The tight fitting liner is physically supported by the pipeline and so may depend on the strength of the pipeline to contain the pressure of the fluid or gas in the pipeline. Tight fitting liners offer certain advantages over loose fitting liners in that they may be less expensive, they do not have to bear significant loads, and they maintain the greatest possible inside diameter. Several methods of installing tight fitting liners are described in U.S. Pat. No. 5,072,622 (Roach and Whitehead) and more fully disclosed in Canadian Patent 1,241,262 (Whyman and Kneller), U.S. Pat. No. 3,856,905 (Dawson), U.S. Pat. No. 3,959,424 (Dawson), Canadian Patent 575,424 (Lontz et al), and U.S. Pat. No. 3,462,825 (Pope et al).

The problem with tight fitting liners is that although the liner protects the interior of the pipe from corrosion it does not protect the exterior of the pipe. Corrosion damage may weaken the physical strength of the pipe to the point where it is unable to bear the pressure within and cause leakage. Since the tight fitting liner depends on the strength of the pipeline to contain the pressure of the fluid or gas in the pipeline, if the pipeline fails, the liner will therefore fail. Failure of the liner and pipe will result in significant replacement cost and may be catastrophic to the environment depending on the nature of the substance contained in the pipeline.

Thus, repairing an existing pipeline by installing a liner does not solve all of the problems associated with pipelines. The pipeline must also be monitored continuously for leakage and stress in order that repairs can be made quickly.

Leak detection systems associated with leakage into an annular space between a liner and pipeline are known in the art. These systems only have application in dual-pipe or jacketed pipelines or where a loose fining liner is installed. Systems of this type are not suitable for use in a pipe fitted with a tight-fitting liner because in a tightly lined pipe, there is no annulus between the pipe and the liner.

Another leak detection system involves the use of a so called fluid leak detector cable or sensing cable placed in parallel but external to a pipeline. Such a system is disclosed in U.S. Pat. No. 4,029,889 (Mizuochi) and U.S. Pat. No. 4,095,174 (Ishido). In such a system within the detecting cable there are two electrically conductive elements separated by insulation. A leaking substance will permeate the insulation and cause a change in the electrostatic capacity between the conductive elements, which change can be detected and measured by well-known capacitance bridge circuitry.

In addition to leak detection of pipelines, monitoring and measurement of structural loads and stresses in the pipeline are also important.

The use of optical fiber systems has been employed as a means for locating and measuring stress forces. Short bends in an optical fiber, commonly called microbends, cause an attenuation in the back scattered light intensity from a transmitted light signal and an optical time domain reflectometer (OTDR) has been used to monitor the cause and effects of microbending in optical fibers.

U.S. Pat. No. 4,795,232 (Persson) discloses a fibre optic cable responsive to microbending forces. U.S. Pat. No. 4,42,979 (Asawa) discloses a system for the remote measurement of structural forces by microbending of optical fibers. This system includes an optical fiber extending along the length of the structure in association with a series of microbend transducers. U.S. Pat. No. 4,654,520 (Griffiths) discloses another system for structural monitoring using fibre optics which includes attaching an optical fiber directly to the structure to be monitored.

All of the above mentioned leak detection systems and structural monitoring systems bear the disadvantage of being mounted externally to the pipeline, totally separate and apart from a liner. The tightly fitting liner mentioned above bears a disadvantage of being unable to contain the pressure of the pipe.

SUMMARY OF INVENTION

The present invention provides a liner for pipe or pipelines wherein the liner is multi-layered, including an external jacket, an interior liner, a woven intermediate layer for providing strength to contain the pressure of the pipe into which the liner is fitted and thereby eliminate disadvantages found in previously known tightly fitting liners and at least one optical fiber woven in the woven intermediate layer.

A capacitance leak detecting circuit could be included in the liner for monitoring by capacitance bridge apparatus thereby eliminating the difficulty and the expense of installing a leak detection cable external to the pipe itself.

At least one optical fiber can be woven into the woven intermediate layer of the liner whereby stress in the liner and pipe would induce microbending in the optical fiber which would in turn be monitored by a optical time domain reflectometer (OTDR) thereby eliminating the difficulty and expense of installing optical fibers on the external surface of the pipe.

At least one optical fiber can be placed within the layers of the liner for data transfer or communication along the length of the pipe.

The present invention provides a method for monitoring stress in a pipe or pipeline lined with a multi-layered liner which has an external jacket, an interior liner, a woven intermediate layer between the external jacket and the interior liner and at least one optical fiber running the length of the multi-layered liner in the woven intermediate layer, further comprising the step of connecting the stress detector to the optical fiber, transmitting a light signal through the optical fiber, and monitoring the back scattered light intensity to detect micobending in the optical fiber.

The present invention further provides for a method of monitoring leakage in a pipe or pipeline lined with the multi-layered liner which has an external jacket, and interior liner, a non-conductive woven intermediate layer interposed between the external jacket an interior liner, a conductive layer interposed between the exterior jacket and the non-conductive woven intermediate layer and a conductive element running the length of the multi-layered liner and radially separated from the conductive layer by the non-conductive woven intermediate layer, further comprising the steps of connecting a leak detector to the conductive layer and the conductive element, and measuring changes in the electrostatic capacity between the conductive layer and the conductive element to detect leakage onto the non-conductive woven intermediate layer.

The present invention further provides a method of monitoring leakage in a pipe or pipeline lined with the multi-layered liner which has a external jacket, an interior liner, a non-conductive woven intermediate layer interposed between the external jacket interior liner and at least two conductive elements (e.g. conductive cables) running the length of the multi-layered liner and separated from each other by the non-conductive woven intermediate layer, comprising the steps of connecting a leak detector to the conductive elements, and monitoring changes in the electrostatic capacity between the conductive elements to detect leakage onto the non-conductive woven intermediate layer.

DETAILED DESCRIPTION OF THE INVENTION

Figure 1:
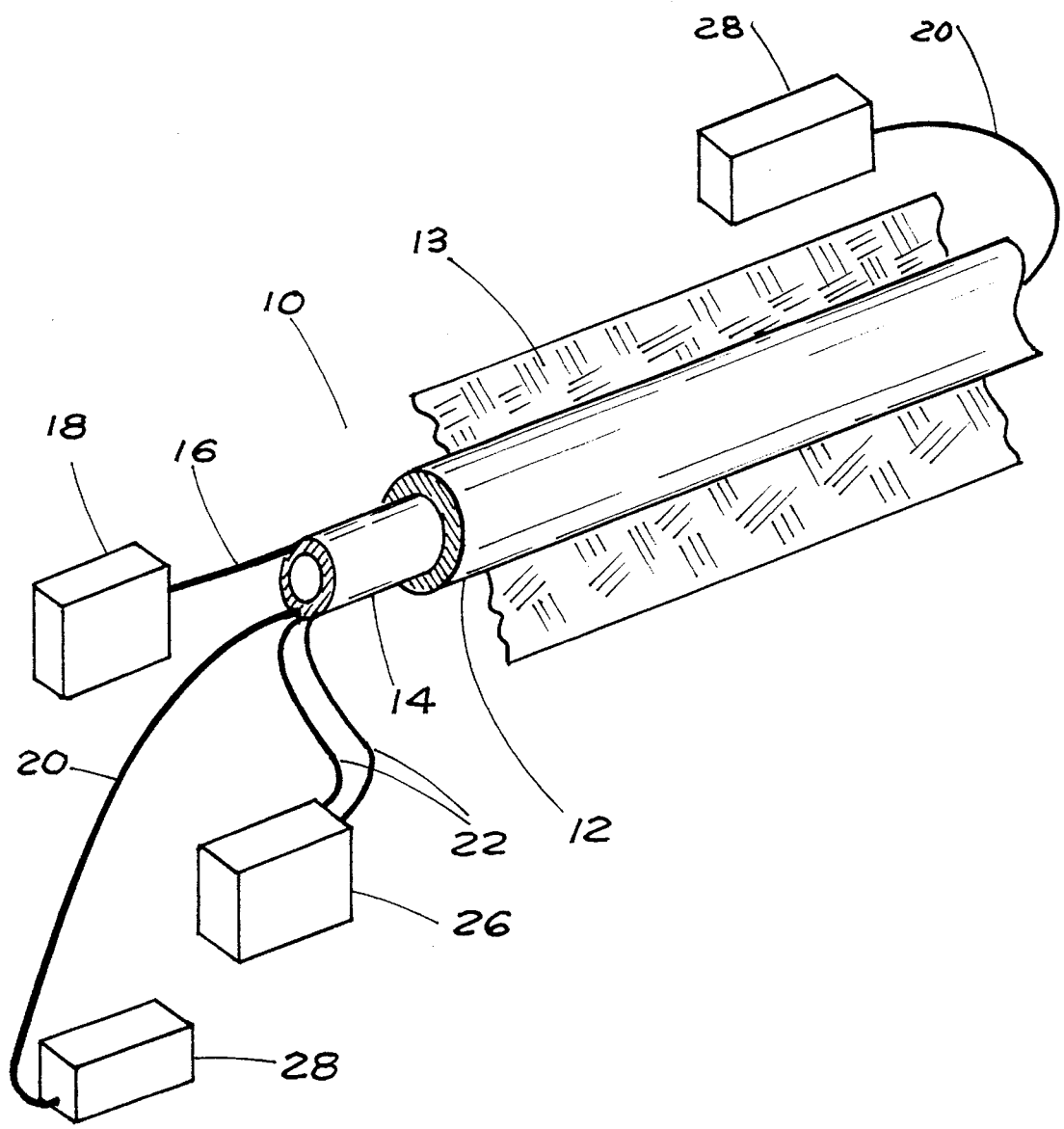
FIG. 1 shows a cut away perspective of a pipeline together with an embodiment of the liner of this invention in place in the pipeline together with apparatus in block form for monitoring leakage and stress in the pipeline, and monitoring communication from one point on the pipeline to another.

A pipe liner and monitoring system 10 is illustrated generally in FIG. 1. The system illustrated is particularly for use in lining an existing pipeline 12, monitoring and detecting leakage along the pipeline 12, monitoring and detecting stress along the pipeline 12, as well as providing a communication link along the pipeline 12. The combination of monitoring and detecting both stress and leakage along the pipeline 12 will also allow for the detection of a blockage in the pipeline 12. If either leakage or blockage occurred in the pipeline 12, the internal pressure in the pipeline will be reduced at the point of occurrence which reduction in pressure would be monitored and detected as a change in stress. However, if no leakage is detected then the problem is a blockage. As shown, the pipeline is buried in the soil 13, but the pipeline need not be buried to use the system described. As shown, the pipe liner and monitoring system 10 may include a multi-layered liner 14 fitted in the pipeline 12.

The multi-layered liner 14 may include at least one optic fiber 16 running the length of the liner 14 in a manner such that stress in liner 14 and pipeline 12 will induce localized microbending in the optic fiber 16. A stress detector 18 may be connected to the optic fiber 16 to provide a light source and to monitor and detect the abrupt attenuation of light and change in backscattered light caused by microbending in the optic fiber. The preferred stress detector is an optical time domain reflectometer available by SIECOR in Model M51 although other similar models could be used.

Also shown in FIG. 1 are two conductive elements 22 which may run the length of liner 14 and form part of a capacitance circuit connected to a detector 26 for detecting leakage through both the liner 14 and the pipeline 12. A preferred leak detector is a time domain reflectometer available by Tektronix 1500 Series cable testers. Also shown in FIG. 1 is at least one additional optic fiber 20 running the length of the pipeline 12 for communicating between one end of the pipeline 12 to the other end or at any point therein by connection to communication links 28 for transmittal and receiving of data or voice communication. Although a separate optic fiber 20 is shown for use in communication, the same optic fiber 16 used for monitoring stress can be used as a means of communication in connection with communication links 28.

Figure 2:
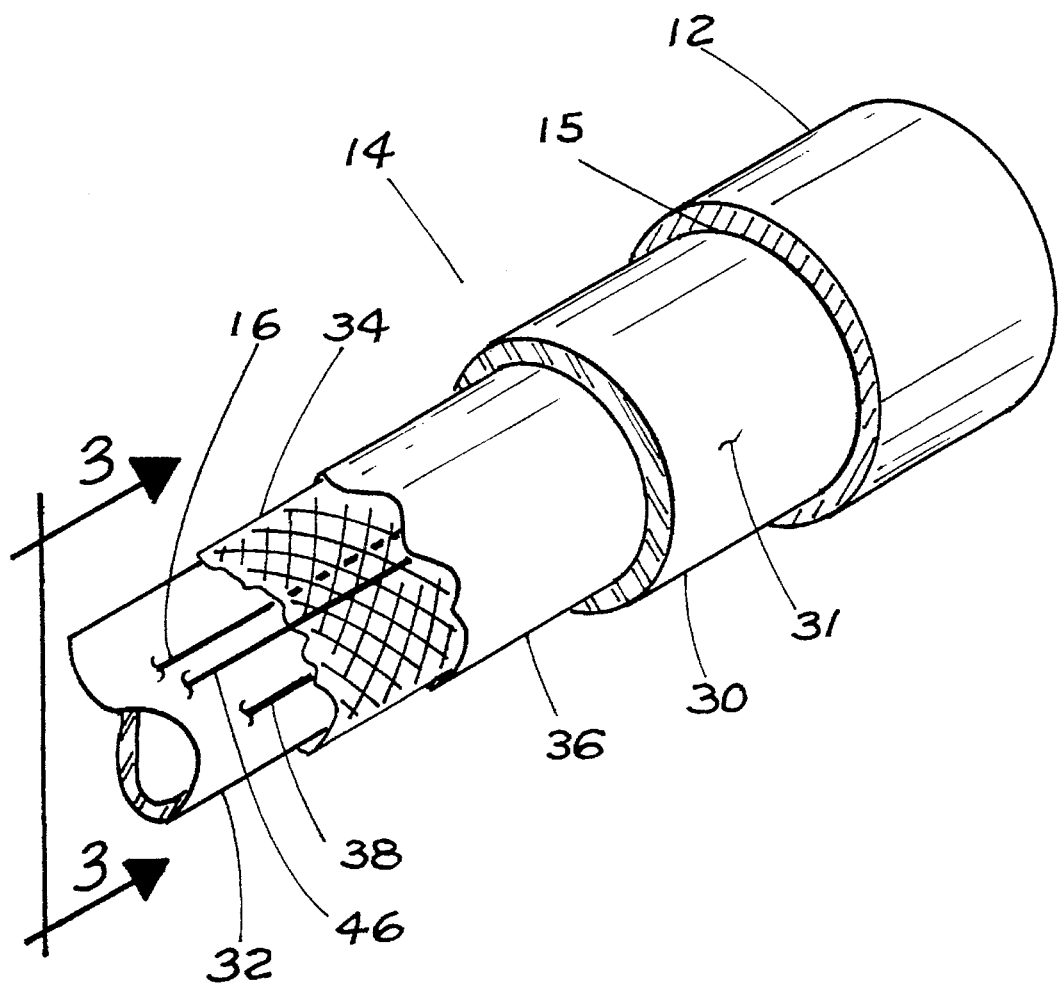
FIG. 2 shows a cut away perspective of an embodiment of the liner of this invention in place in a pipe.

Referring now to FIG. 2, there is shown a cut away perspective of a multi-layered liner 14 installed in a pipeline 12. As shown, the liner 14 may include an external jacket 30 with an exterior surface 31 engaging the inner surface 15 of the pipeline. The liner 14 also includes an interior liner 32 of such material and composition as to be impervious to whatever substance is carried in the pipeline 12. It is preferred that both the jacket 30 and the internal liner 32 be of thermoplastic material. The interior liner 32 is a standard commercially available component. Depending on the application, the internal liner 32 could be polyurethane, nylon, polyamide, teflon, PVC, polypropylene, polyethylene or polyolefin for example. The external jacket 30 can be of the same or different material than the internal liner 32 depending on the application. This jacket 30 may be extruded by a standard "cross-head."

Between the jacket 30 and internal liner 32 is a woven intermediate layer 34. In addition to the traditional left to right and right to left weaving this intermediate layer may also be woven in the longitudinal direction. This allows the integral longitudinal weaving of at least one optic fiber 16 in the woven intermediate layer 34. Also shown is at least one conductor 38 which can either be woven longitudinally in the woven intermediate layer 34 or placed longitudinally between the woven intermediate layer 34 and the inner liner 32. The material for the woven intermediate layer 34 will also depend on what is needed or appropriate for the given application. For example, material could be KEVLAR, nylon, polyester or polypropylene. The size, number, and type of weaving elements would be chosen to be commensurate with the size of the multi-layered liner 14 and the pressure to be contained and configured to impart the proper degree of microbending of the optic fiber 16 based on the known use of the original pipe line 12. Lower pressures would require a more acute angle of microbend than a higher pressure and vice versa.

A preferred embodiment may include a conductive layer 36 between the woven intermediate layer 34 and the external jacket 30. A preferred material for this layer 36 is aluminum/mylar consisting of 0.0005 "of aluminum bonded to 0.00092" of mylar and applied by a standard eccentric tape head. This conductive layer 36 and a conductor 38 would act as the necessary conductive elements 22 for monitoring of leak detection. The conductor 38 and the conductive layer 36 are separated by the woven intermediate layer 34. By using non-conductive material for the woven intermediate layer 34, a capacitance circuit is created. Leakage of a fluid into this intermediate layer 34 changes its electrostatic capacity, which change can be detected by leak detector 26.

Figure 3:
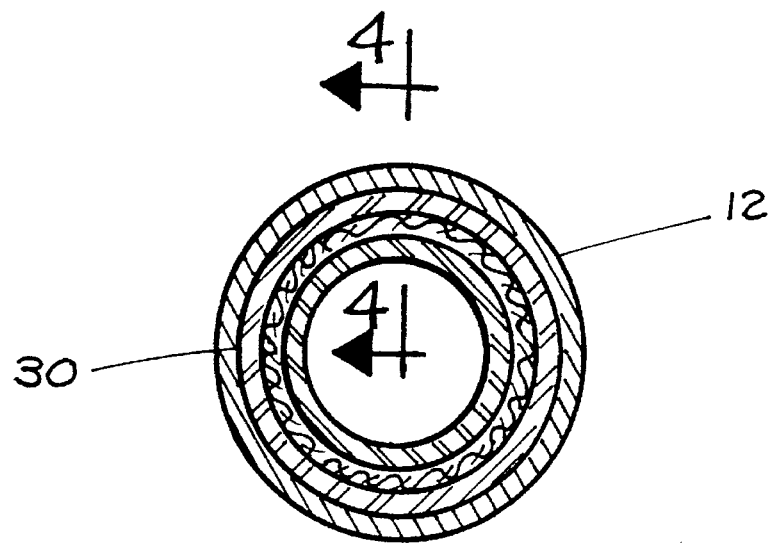
FIG. 3 shows a cross section taken in the direction of the arrows 3—3 in FIG. 2.
Figure 4:
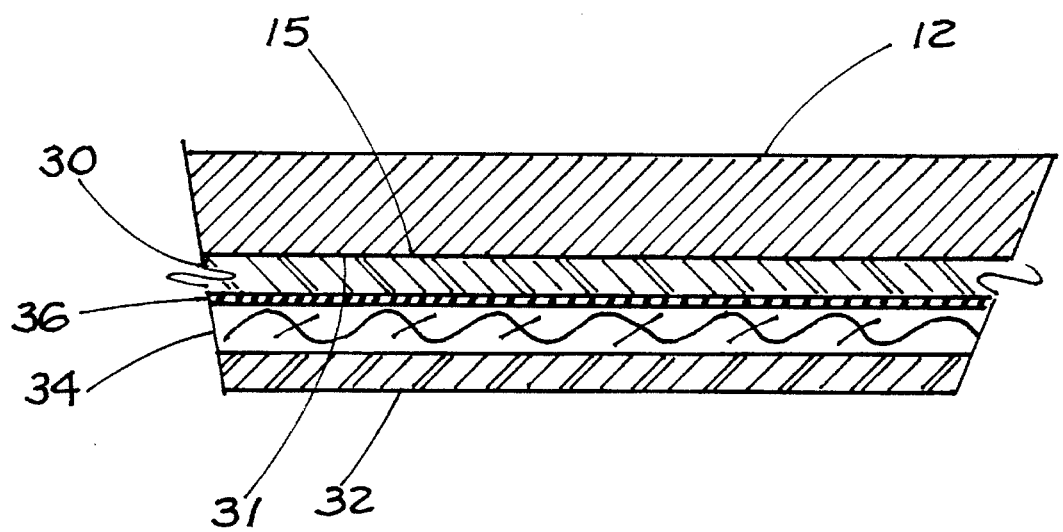
FIG. 4 shows a cross section taken in the direction of arrows 4—4 in FIG. 3.

FIG. 3 presents a full cross section of the multi-layered liner 14 in place in a pipeline 12, and FIG. 4 presents an expanded longitudinal view of the components and their relative positions. It is preferred that all the elements of the multi-layered liner 14 have sufficient flexibility that when the liner 14 is assembled, it can be collapsed as shown in FIG. 6 to aid in the installation of the liner 14 in an existing pipeline 12 but without damage to any of the components of the liner.

Figure 5:
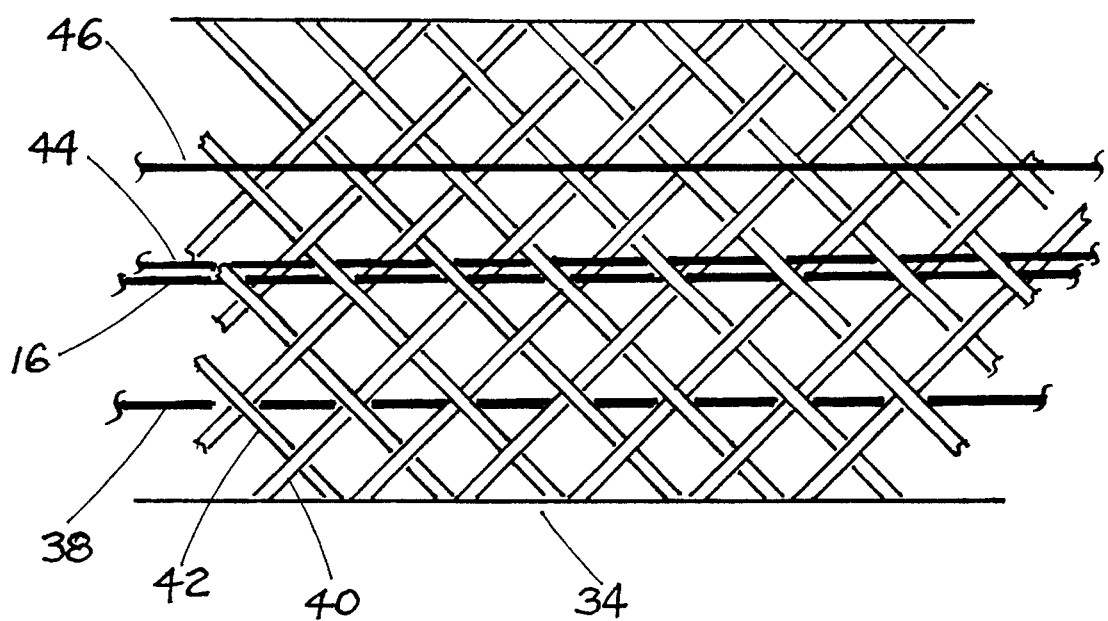
FIG. 5 shows a plan of the weave pattern of a preferred embodiment of the intermediate layer of the liner.

Referring now to FIG. 5, a simplified view of the weave pattern in layer 34 is shown. This woven intermediate layer 34 serves at least three purposes: (1) reinforcement for pressure containment; (2) supplies a controllable "edge" by which to microbend an optical fiber (this woven intermediate layer will impart a bending moment or stress against an optical fiber commensurate with applied pressure and in accordance with basic mechanics of materials); (3) acts as an electrical and/or thermal insulator. As shown, there are typically a first set of strand members 40 woven in a substantially right to left direction, and a second set 42 woven in a substantially left to right direction. While not necessarily required for the strength carrying capability of this woven intermediate layer, longitudinal strands 44 can be introduced in an over and under pattern during the weaving process. In connection with this longitudinal weaving, at least one optic fiber 16 can be woven parallel and adjacent to any longitudinal strand. Because of this interweaving, stress in the strands of the woven intermediate layer will induce microbending in the optic fiber. It is also shown that a separate reference optic fiber 46 can be run adjacent to the interwoven optical fiber 16 but outside the woven intermediate layer 34 and not interwoven. The braid is accomplished with the use of a standard "maypole" type braiding machine. The insertion of additional strength strand members, conductive elements and/or optical fibers in the longitudinal direction is accomplished by drilling a hole through the quoit stud bolt of the braiding machine. Welding a guide tube to the top of the now hollow quoit stud bolt allows elements to be fed from below the machine into the braiding operation. Using known formulas and mechanics, one can now insert a given optical fiber for any given pressure, size of pipe (radius), modulus-durometer-shape-size of braiding material in order to cause the proper amount of microbending to take place for proper monitoring.

It is also shown that a conductor 38 be woven in a longitudinal direction during the weaving of the woven intermediate layer 34 as an integral component of the leak detection monitoring system.

Figure 6:
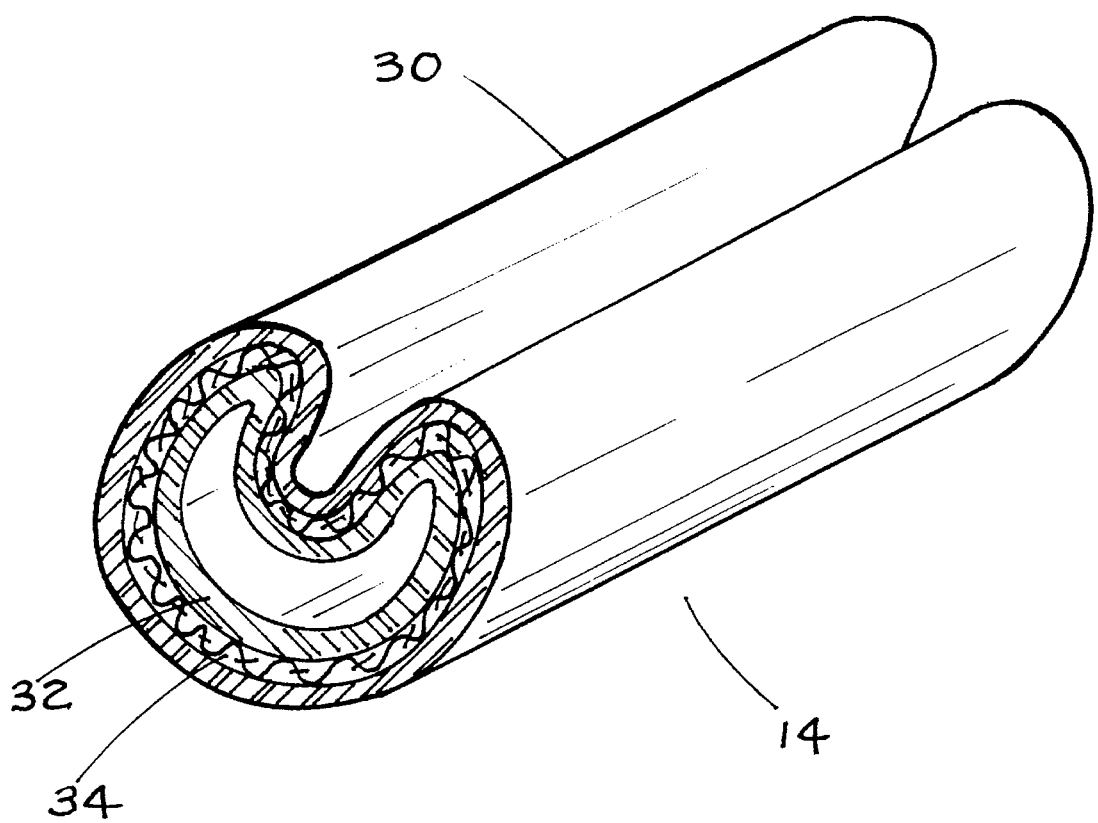
FIG. 6 shows a perspective view of an embodiment of the liner in a collapsed condition for purposes of insertion into a pipe.

The assembled multi-layered liner 14 can be collapsed as shown in FIG. 6 for insertion into an existing pipe line 12. All layers of the multi layered liner 14 are made of compounds having a modulus of elasticity conducive to collapsing the liner into a reduced shape. This feature eliminates the need for heavy deforming equipment, and eliminates transportation problems of cubic area constraints.

While the methods and components discussed above generally relate to a factory assembly of the multi-layered liner 14 before installation, the techniques can be done in reverse order for field assembly and installation. The jacket 30 would be installed first and would preferably be either an irradiated PVC or polyolefin, commonly referred to as shrink tubing. This type of thin walled tubing would be sized to the pipe line 12 by shrinking down an oversized tube to fit the inside diameter of the pipe line 12. The jacket 30 could easily be folded over to a much smaller size than the pipe line 12 and easily inserted into the pipe line 12. Once inserted into the pipe line 12 in the folded over configuration, the ends of the jacket 30 are plugged with valves in both ends. A low pressure steam is injected into one end of the jacket 30 which would expand the jacket 30 and the heat would shrink the jacket 30 to its recovered size thereby fitting the pipe line 12. A woven intermediate layer 34 would now be "slid" over a folded internal liner 32 of shrink tube material and together inserted into the already lined pipe line 12. A reapplication of low pressure steam would now expand the folded internal liner 32 and woven intermediate layer to fit against the jacket 30 already engaged against the pipe line 12. The electro-optical detection circuitry can simply be inserted in the liner layers prior to insertion of the layers in the pipeline.

Stress in pipeline 12 is monitored by transmitting a light signal through the optical fiber 16, and monitoring the backscattered light intensity via stress detector 18 to detect microbending in the optical fiber 16.

To monitor leaking, a pipeline 12, lined with the multi-layered liner 14 which has an external jacket 30, an interior liner 32, a non-conductive woven intermediate layer 34 interposed between the external jacket 30 and interior liner 32, a conductive layer 36 interposed between the exterior jacket 30 and the non-conductive woven intermediate layer 34 and a conductor 38 running the length of the multi-layered liner 14 and radially separated from the conductive layer 36 by the non-conductive woven intermediate layer 34 is utilized. A leak detector 26 may be connected to the conductive layer 36 and the conductor 38. Changes in the electrostatic capacity between the conductive layer 36 and the conductor 38 are then measured to detect leakage onto the non-conductive woven intermediate layer 34.

Alternatively, to monitor leaking, a pipeline 12, lined with a multi-layered liner 14 which has an external jacket 30 an interior liner 32, a non-conductive woven intermediate layer 34 interposed between the external jacket 30, interior liner 32, and at least two conductors 38 running the length of the multi-layered liner 14 and separated from each other by the non-conductive woven intermediate layer 34 is utilized. A leak detector 26 may be connected to the conductors 38. Changes in the electrostatic capacity between the conductors 38 are then measured to detect leakage onto the non-conductive woven intermediate layer 34.

To communicate and transmit data along a pipeline, communication links 28 may be connected to either optic fiber 20 or optic fiber 16.

We claim:

1. A multi-layered liner for lining and monitoring a pipeline comprising, an external jacket, an interior liner, a woven intermediate layer interposed between the external jacket and interior liner and at least one optical fiber running the length of the multi-layered liner to monitor stress in the pipeline, said optical fiber being woven into the woven intermediate layer.

2. The multi-layered liner of claim 1, wherein the external jacket and interior liner are each made of thermoplastic material.

3. The multi-layered liner of claim 1, wherein the woven intermediate layer has at least two sets of strands including a first set woven from right to left and a second set woven from left to right.

4. The multi-layered liner of claim 3, wherein the optical fiber is woven into the woven intermediate layer directly adjacent to a strand of the woven intermediate layer.

5. The multi-layered liner of claim 4, further comprising a reference optical fiber on a surface of the woven intermediate layer running adjacent and parallel to the optical fiber woven into the woven intermediate layer.

6. The multi-layered liner of claim 1, wherein the woven intermediate layer is a non-conductive material.

7. The multi-layered liner of claim 6, wherein the external jacket and interior liner are each made of thermoplastic material.

8. The multi-layered liner of claim 6, further comprising a conductive layer interposed between the exterior jacket and the non-conductive woven intermediate layer and a conductor running the length of the multi-layered liner and radially separated from the conductive layer by the nonconductive woven intermediate layer.

9. The multi-layered liner of claim 6, further comprising at least two conductive elements running the length of the multi-layered liner and separated from each other by the nonconductive woven intermediate layer.

* * * * *